United States Patent [19]

Fremy

[11] Patent Number: 4,703,958
[45] Date of Patent: Nov. 3, 1987

[54] FAST CONNECTION WITH RADIALLY ACTING BOLT

[76] Inventor: Raoul Fremy, Villa Emilia, 17 Rue Cecile Vallet, 92340 Bourg La Reine, France

[21] Appl. No.: 826,278

[22] Filed: Feb. 5, 1986

[30] Foreign Application Priority Data

Feb. 8, 1985 [FR] France .................. 85 01835

[51] Int. Cl.⁴ ............................................. F16L 37/22
[52] U.S. Cl. .................................. 285/316; 251/149.6; 285/317
[58] Field of Search ............... 251/149.6, 149.2, 149.9; 285/314, 315, 316, 317, 178; 137/614.02, 614.03, 614.04

[56] References Cited

U.S. PATENT DOCUMENTS

| | | | |
|---|---|---|---|
| 3,265,408 | 8/1966 | Dickie | 285/316 |
| 3,279,497 | 10/1966 | Norton | 137/614.03 |
| 3,423,063 | 1/1969 | German | 251/149.9 |
| 3,618,892 | 11/1971 | Sciuto | 251/149.2 |
| 3,727,952 | 4/1973 | Richardson | 285/316 |
| 3,918,492 | 11/1975 | Karcher | 137/614.04 |
| 3,948,547 | 4/1976 | Gache | 285/317 |
| 4,181,149 | 1/1980 | Cox | 137/614.02 |
| 4,357,037 | 11/1982 | Oetiker | 285/314 |
| 4,376,525 | 3/1983 | Fremy | 251/149.6 |
| 4,413,846 | 11/1983 | Oetiker | 285/317 |
| 4,483,510 | 11/1984 | Palau et al. | 251/149.6 |
| 4,543,993 | 10/1985 | Calvin et al. | 285/316 |
| 4,576,359 | 3/1986 | Oetiker | 251/149.6 |
| 4,627,598 | 12/1986 | Fremy | 251/149.2 |

FOREIGN PATENT DOCUMENTS

| | | | |
|---|---|---|---|
| 1503989 | 12/1967 | France | 251/149.6 |
| 1556415 | 2/1969 | France | 285/317 |
| 472623 | 6/1969 | Switzerland | 251/149.6 |

Primary Examiner—Cornelius J. Husar
Assistant Examiner—Eric K. Nicholson
Attorney, Agent, or Firm—Cooper, Dunham, Griffin & Moran

[57] ABSTRACT

The present invention relates to a fast connection with radially acting bolt-locking having a groove in the male element and a bolt in the female element that can receive an axial displacement and whose rear flank when locking engages in the groove of the male element, the bolt being urged into locking by a spring. According to the invention, at least two balls mounted with free radial play in the body of the female element are interposed between at least two points on the perimeter of the bolt symmetrical to the axis of thrust of the spring and a longitudinal ramp embodied on the inner surface of a sliding ring. The invention is applicable to fast connections for piping.

6 Claims, 14 Drawing Figures

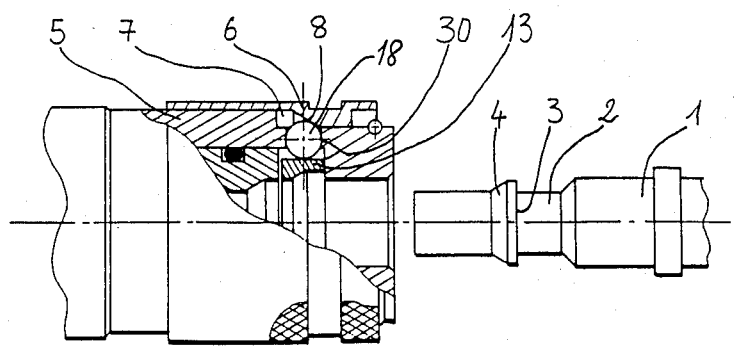
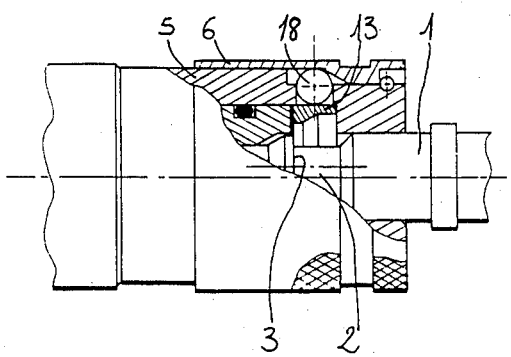
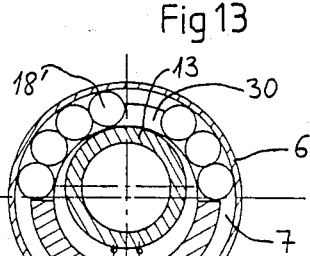
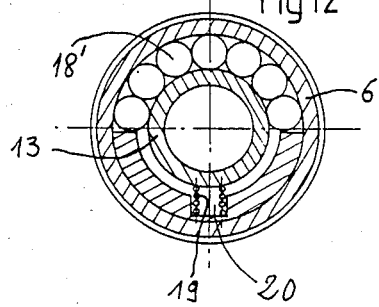
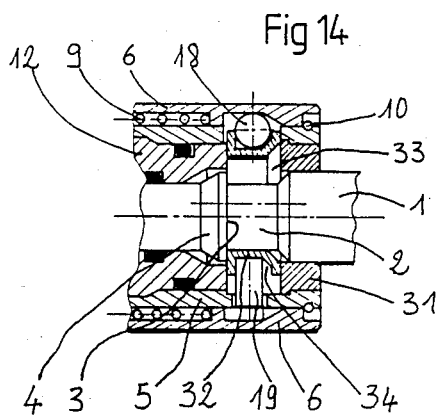

FAST CONNECTION WITH RADIALLY ACTING BOLT

BACKGROUND OF THE INVENTION

This invention relates to fast connections, exemplified by connecting or coupling devices operable to rapidly couple or uncouple lengths of pipe.

We are familiar with a variety of fast connections having, in the perimeter of the male element, a groove whose front flank is substantially perpendicular to the axis and, in the female element, a bolt that can receive an axial displacement and whose rear flank, on locking, engages behind the front flank of the male element. The locking, in these models of connections is insured by an automatic ratchet mechanism, the bolt being urged elastically by a spring in the radial locking direction and the nose of the male element has a truncated ramp with which a ramp provided on the bolt will cooperate to shift the pawl from its locking position until the pawl falls back into the groove of the male element.

In many forms of embodiment, and for example as described in French published patent document FR-A-1,402,040, the displacement of the bolt to insure unlocking against the thrust of the spring takes place by repelling the bolt constituted by a cylindrical ring by depression of a pushbutton accessible through an orifice in the peripheral surface of the female element. This embodiment has the drawback that the pushbutton can be depressed accidentally and, above, all that the displacement of the bolt under the influence of the spring can be blocked, for example by dirt entering the pushbutton recess.

The fast connection of the type concerned by the invention described in French published patent document FR-A-1,363,394 does not have the above drawbacks because the bolt is shifted from its locking position against the action of the spring, by an axial sleeve mounted in the female element, a sleeve inside which the nose of the male element fits, this sleeve being subject to the thrust axially inward of the female element by action on a peripheral jacket surrounding the said element in order, by cooperation of its truncated end with a truncated area in the front face of the bolt, to shift the bolt radially. This arrangement, however, has the drawback that this unlocking sleeve substantially increases the diameter of the female element for a given clear section of the connection.

French published patent document FR-A-1,487,324 proposes to embody the bolt in the form of a part sliding in a guide in the body of the female mouthpiece, the end of the bolt opposite the return spring cooperating with a ramp formed in the inner wall of a ring sliding axially so that the bolt will be free to return to the engaged position or be repelled for unlocking against the action of the spring. In order to obtain a precise positioning of the bolt in unlocked position, the sliding bolt must be guided without play, and then there are risks of jamming and blocking the bolt, particularly in unlocked position.

We also know of ball-type fast connections, but the balls which engage in a groove in the male element on being repelled by a ring sliding longitudinally on the female connection, constitute the locking members by themselves.

One general drawback of the fast connections used in particular for connecting pipelines of gas under pressure is that the pressure which remains as a general rule in the piping integral with the male element will cause, at the moment of unlocking, an abrupt separation of the connecting elements with abrupt deformations of the flexible piping.

There has already been a proposal, for example in Swiss published patent document CH-A-368,669, of a connection in which the male element is unlocked in two stages, the locking being insured by two peripheral rows of balls engaging in a peripheral groove of wide longitudinal width in the male element, the ring controlling the eclipsing of the balls having two parallel internal peripheral grooves. Since the flawless operation of the two locking devices is extremely important in this application for reasons of safety, the transportation of the case of locking by radially acting bolt raised the same problem as set forth above with the consequences resulting from the jamming of a bolt which could be very serious.

SUMMARY OF THE INVENTION

It is an object of the present invention to remedy the above drawbacks and in particular to insure a perfect positioning of the bolt in the unlocked position with no risk of jamming of the bolt in either of the two positions, since the bolt is mounted to float.

This is achieved, according to the invention, by the fact that at least two balls mounted with freedom of radial displacement in the body of the female element, are interposed between at least two points on the perimeter of the bolt symmetrical to the axis of thrust of the spring urging the bolt and the longitudinal ramp embodied on the inner surface of the sliding ring, the diameter of the balls being equal to the radial distance between the surface of the sliding ring corresponding to the unlocked position and the surface of the perimeter of the bolt. The component of the forces of thrust of the two balls is directed against the action of the spring and the forces of thrust of the two balls are balanced only when the bolt is perfectly centered between the two balls. This eliminates the necessity for a radial guidance of the no-play sliding of the bolt.

According to a preferred embodiment, the female element has three balls mounted loose in three radial holes, one situated facing and along the axis of thrust of the spring and the other two on the diameter perpendicular to this axis, the latter two insuring the centering of the bolt on the axis of thrust on the spring.

According to another embodiment, the female element has a plurality of balls mounted in a furrow in the body, in a sector of a circle symmetrical to the axis of thrust of the spring, the difference between the radius of the cylindrical peripheral surface of the bolt and the radius of the inner surface of the ring cooperating with the balls in unlocked position, being equal to the diameter of the balls and the peripheral development of the furrow along a circle whose radius corresponds to the radius of the peripheral surface of the bolt, plus the radius of one ball, being substantially equal to the diameter of a ball multiplied by the number of balls. This furrow, when made with a development close to 180°, also permits the introduction of the bolt and of its return spring, laterally in the body of the female element.

The radial thrust spring insuring the locking can be a coil spring pressing in a blind recess. According to a preferred embodiment which permits guiding and holding the spring in a simple hole, the spring is made by cutting and bending a strip of spring steel so as to form two opposing wings in a Vee upright toward the center relative to the body of the spring in a cylindrical sector which presses on the inner surface of the cylindrical body of the female element, the said wings pressing under the bolt and guidance being insured by engagement of a radial central spur of the spring body in a radial hole in the body of the female element.

Two bolts displaced and guided by balls according to the invention can be mounted in series longitudinally in the body of the female element, the balls proper to the two bolts cooperating successively with a rib borne by the inner surface of the sliding ring which repels them and recenters successively first the one and then the other bolt, and insures an unlocking in two stages.

The invention will be described in more detail below in the form of some examples of embodiment with reference to the attached drawings.

BRIEF DESCRIPTION OF THE DRAWINGS

FIG. 10 is a view corresponding to FIG. 2 for an embodiment of the connection;

FIG. 11 is a view corresponding to FIG. 2 for this other embodiment of the connection;

FIGS. 12 and 13 are views in cross section through the plane of the locking ring of a connection according to another embodiment; and FIG. 14 is a view in section corresponding to FIG. 11 for another embodiment.

DETAILED DESCRIPTION

Figure 1:
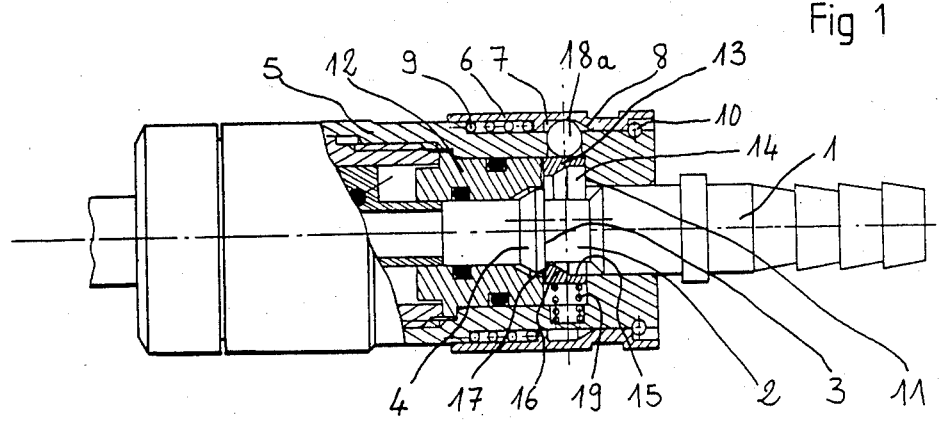
FIG. 1 is a view in partial axial section of a connection according to the invention in the locked state.
Figure 2:
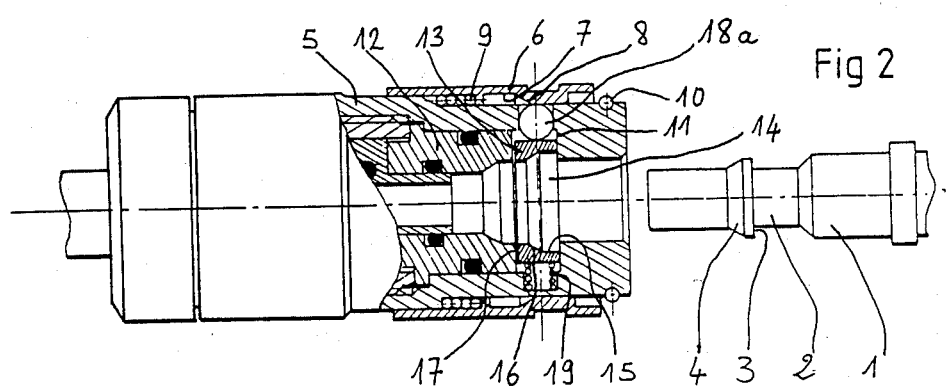
FIG. 2 is a corresponding view in the unlocked state.
Figure 3:
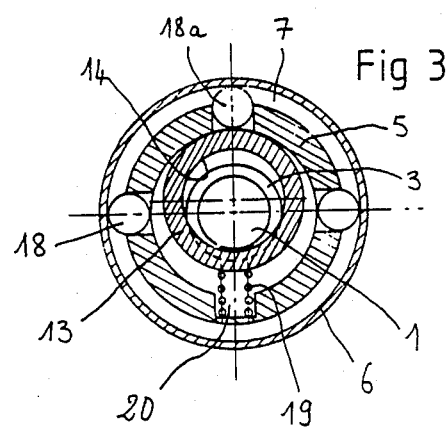
FIG. 3 is a view in section through III—III in FIG. 1.
Figure 4:
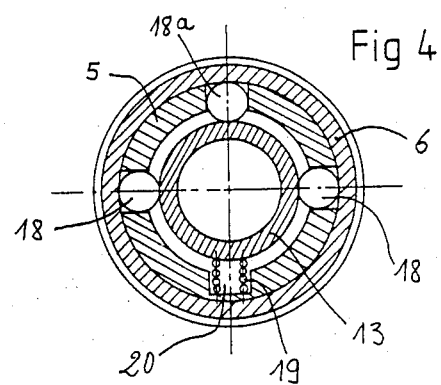
FIG. 4 is a view in section through IV—IV in FIG. 2.

In the drawings, reference 1 designates the male element of the connection, reference 2 the locking groove on the perimeter of the male element, reference 3 the front flank of this groove and reference 4 the ramp in the shape of a truncated cone which, as the sections are fitted together, shifts the bolt from its locking position against the action of the locking spring. In the sectional views the male element is generally omitted.

In the drawings, reference 5 designates, as a whole, the female element of the connection, reference 6 the sliding ring that operates the unlocking on the outside of the female element.

In the embodiment of FIGS. 1 to 4, the ring 6 has a groove 7 of trapezoidal section forming a ramp 8 in the shape of a truncated cone toward the front, the ring being urged forward by a spring 9 and stopped by a retainer 10.

In the body of the female element, a bolt 13 is mounted slidably between a frontal area 11 of body 5 and a bushing 12 inside this body. This bolt has the form of a cylindrical ring with a stepped bore 14, the part of the bore with the largest diameter 15 being directed forward and united by an area 16 in the shape of a truncated cone with the part of smallest diameter whose rear flank 17 constitutes the locking flank cooperating with the flank 3 of the groove in the male element to insure the locking.

Three balls 18 and a spring 19 cooperate with the peripheral surface of bolt 13. The balls 18 are set in three radial holes spaced at 90° in body 5 and the spring 19 is lodged in a blind hole 20 in the said body. One of the balls 18a lies on the same diameter as the spring 19, and opposite the latter.

The locking according to this first embodiment works as follows: Under the influence of spring 9, ring 6 is repelled forward to abut against retainer 10 and groove 7 is aligned with balls 18. The said balls can therefore be repelled into groove 7 under the influence of spring 19 (FIGS. 1 and 3) and bolt 13 is pushed toward ball 18a while being free to move in its recess. When the male element 1 of the connection is introduced, the latter penetrates into bore 14 of the bolt and the frustoconical ramp 4 of the male element comes into cooperation with the frustoconical ramp 16 of bolt 13 to recenter the latter against the action of spring 19. When the rear face 17 of the bolt passes beyond the flank 3 of groove 2 in the male element, bolt 13 engages in the groove under the influence of spring 19 to insure the locking. To unlock the connection, ring 6 is moved back against the action of spring 9 and the frustoconical ramp 8 repels the three balls 18 toward the center as it compresses spring 19. When the balls 18 are on the cylindrical area of ring 6, beyond the groove 7 (FIG. 4), the bolt 13 is perfectly centered and flank 17 of the bolt is clear of the flank 3 of the groove in the male element which can be withdrawn freely from the female element.

Figure 6:
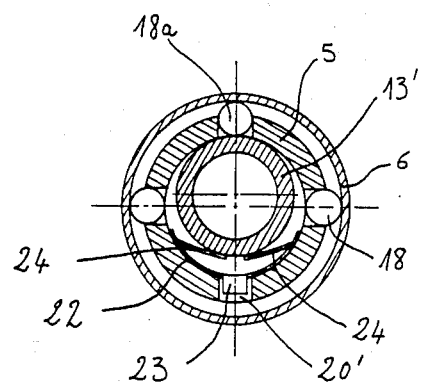
FIG. 6 is a view in section through VI—VI in FIG. 5.
Figure 5:
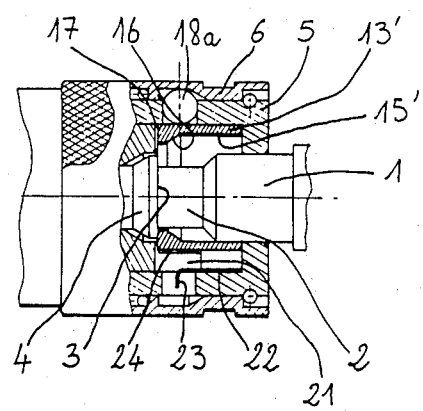
FIG. 5 is a view corresponding to FIG. 1 for another embodiment.

The embodiment in FIGS. 5 and 6 is distinguished from the above embodiment by the fact that the cylindrical bolt 13' is longer owing in particular to the elongation of the bore 15' and that spring 19 is replaced by a leaf spring designated by the general reference 21. This spring has a body in an arc of a circle 22 which fits inside the body 5 of the female element and is centered by a spur 23, cut out and bent, which is engaged in a radial hole 20' identical to the holes receiving the balls 18. Two wings 24 are cut out on either side of spur 23 and curved toward the center to press under part 16-17 of the bolt and repel the said bolt to center it toward ball 18a.

This embodiment works in a manner identical to that described for the embodiment in FIGS. 1 to 4.

Figure 7:
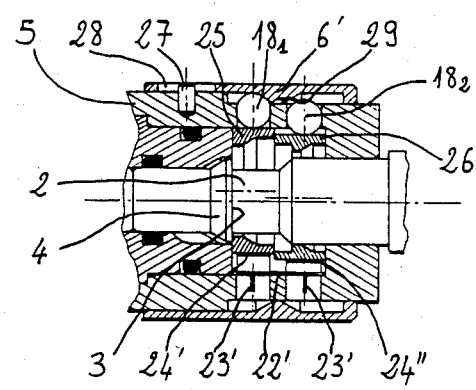
FIG. 7 is a view in partial section in the locked state of a connection having two bolts in series.
Figure 8:
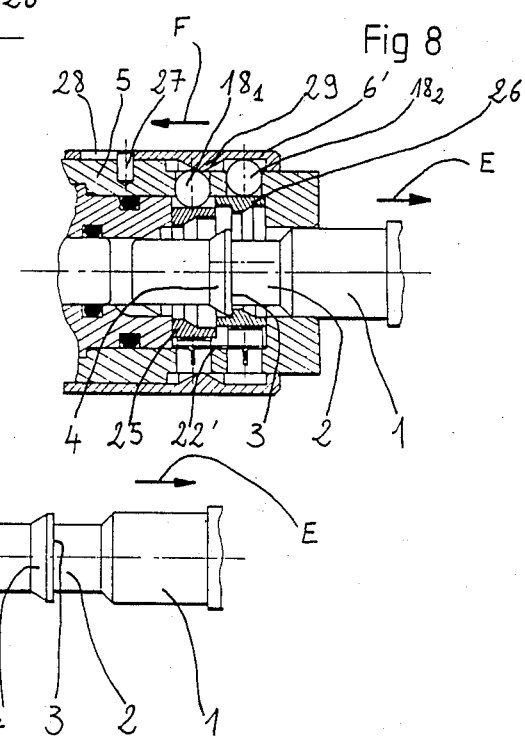
FIG. 8 is a view of the same connection corresponding to FIG. 7 after the first stage of unlocking.
Figure 9:
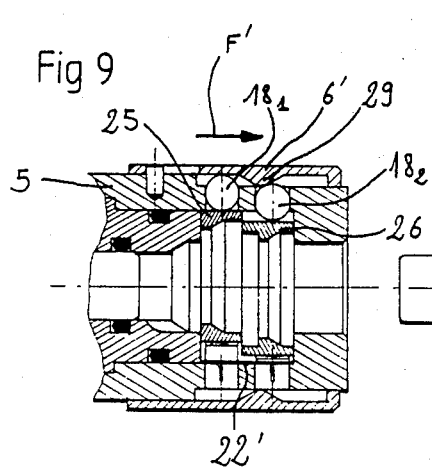
FIG. 9 is a view of the same connection corresponding to FIG. 7 after the second state of unlocking.

In the embodiment in FIGS. 7 to 9, two bolts 25-26 of substantially the same form as bolt 13 are mounted to slide between area 11 and bushing 12 in the body of the female element. Each bolt is subject to the action of three balls respectively $18_1$-$18_2$ similar to the balls 18 above and to the action of a spring constituted, in the embodiment represented, by two pairs of wings 24', 24" cut in a body 22' centered by nipples 23'.

The peripheral ring 6' of the female element of the connection slides freely while being held by a pin gudgeon 27 engaged in a longitudinal opening 28. Ring 6' has a rib of trapezoidal section 29 which is mounted between the two rows of balls $18_1$-$18_2$.

In the uncoupled state of the connection, the two bolts 25-26 are pushed into eccentric positions by the spring leaves 23'-23', the balls $18_1$-$18_2$ pressing on the inner surface of ring 6' on either side of rib 29. As the male element is fitted in, the frustoconical ramp 4 of the male element recenters bolt 26 which falls back into groove 2 then bolt 25 which falls back with its front flank behind the flank 3 of the groove in the male element. The connection is then locked (FIG. 7). To unlock it, ring 6' is pushed in the direction of arrow F in FIG. 8, rib 29 repelling the balls $18_1$ and bringing bolt 25 into centered position. The flank 3 is then clear of bolt 25 and the male element is repelled in the direction of arrow E but flank 3 catches the flank provided on bolt 26 and the male element 1 is in a semi-extracted position in which a leak can be provided to bleed off the pressure prevailing in the male connection 1. By repelling ring 6' in the opposite direction (arrow F'), ramp 29 repels the balls $18_2$ against the action of the elastic leaves 24" which recenters bolt 26. When the locking flank of bolt 26 escapes from the flank 3 of groove 2 in the male element, the latter can be easily extracted along arrow E (FIG. 9).

The embodiment in FIGS. 10 and 11 makes it possible to eliminate the return spring 9 of locking ring 6. To do this, the inner diameter of locking ring 6 and the outer diameter of body 5 in line with the diametral plane of balls 18 is less than the diameter of locking ring 13 plus twice the diameter of the balls 18. As a result, the recoil of the locking ring 6 is stopped before reaching the front edge of ramp 8 and the forward return to position of ring 6 is insured by spring 19 which acts simultaneously on the locking ring 13, the ball 18, and the ramp 8 of ring 6.

The embodiment in FIG. 12 and 13 is similar to that in FIGS. 1 to 4 and works in a similar manner, but the three balls 18 are replaced by a plurality of balls 18' (seven in the example shown) which are lodged in a furrow in an arc of a circle 30 in body 5 of the female element of the connection. The development of this furrow 30 is such that when balls 18' are in contact with the peripheral surface of bolt 13, they are in contact with one another in a circle, concentric both ot the bolt and to the ring 6 (FIG. 12), the bolt then being centered to permit the easy disengagement of male element 1.

In the embodiment of FIG. 14, the front area 11 of the female element is replaced by inset bushing 31 and bolt 32 is constituted by a cylindrical ring with a bevel 33 in the shape of a truncated cone on the entry side and a peripheral groove 34 in which the balls 18 and the spring 19 are lodged. This embodiment makes it possible to reduce the overall diameter of the female element of the connection.

It is to be understood that the invention is not limited to the features and embodiments hereinabove specifically set forth but may be carried out in other ways without departure from its spirit.

I claim:

1. A fast connection with radially acting bolt locking comprising a female element having a body; a male element having a groove in its perimeter, said groove having a front flank substantially perpendicular to the axis of the male element; a radially displaceable bolt in said female element, said bolt having a rear flank which, in a locking operation, engages behind the front flank of the male element groove; and a radial thrust spring for urging the bolt elastically in the radial locking direction; the male element having a nose formed with a frustoconical ramp and the bolt being provided with a ramp for cooperating with the ramp on the male element nose; characterized in that at least two balls (18) mounted with freedom of radial displacement in the body (5) of the female element are interposed between at least two points on the perimeter of the bolt (13) symmetrical to the axis of thrust of the spring (19) urging the bolt and a longitudinal ramp (8) formed on the inner surface of a sliding ring (6), the diameter of the balls (18) being equal to the radial distance between the inner surface of the sliding ring (6) corresponding to the unlocked position and the outer surface of the perimeter of the bolt (13), the bolt being an annulus disposed freely rotatably within a circular region defined by the female element body for free radial movement to an extent limited by the difference in diameters between the bolt and the circular region such that the spring acts to urge the bolt as aforesaid regardless of the angular orientation and radial position of the bolt, and said balls being so disposed as to be displaceable inwardly by the sliding ring for displacing the bolt to the unlocked position in opposition to the force of the spring.

2. A fast connection according to claim 1, characterized in that the female element has three balls (18, 18a) mounted loose in three radial holes, one (18a) located opposite and along the axis of thrust of the spring (19), and the other two (18) on the diameter perpendicular to this axis, the latter two insuring the centering of the bolt (13) on the axis of thrust of the spring (19).

3. A fast connection according to claim 1, characterized in that the female element (5) has a plurality of balls (18') mounted in a furrow (30) in the body, in a sector of a circle symmetrical to the axis of thrust of the spring (19), the difference between the radius of the cylindrical peripheral surface of the bolt (13) and the radius of the inner surface of the ring (6) cooperating with the balls in the unlocked position, being equal to the diameter of the balls (29) and the peripheral development of the furrow along a circle whose radius corresponds to the radius of the peripheral surface of the bolt plus the radius of one ball, being substantially equal to the diameter of a ball multiplied by the number of balls.

4. A fast connection according to claim 1, characterized in that the radial thrust spring that insures the locking is a coil spring (19) pressing in a blind recess (20).

5. A fast connection according to claim 1, characterized in that the radial thrust spring is made by cutting and bending a strip of spring steel (22) so as to form two opposing wings (24) erect toward the center relative to the body in a cylindrical sector of the spring which presses on the inner surface of the cylindrical body (5) of the female element, the said wings pressing under the bolt (13) and guidance being insured by engagement of a central radial spur (23) on the body (22) of the spring in a radial hole in the body (5) of the female element.

6. A fast connection according to claim 1, characterized in that two bolts (25-26) displaced and guided by balls ($18_1$-$18_2$) are mounted in series longitudinally in the body (5) of the female element, the balls ($18_1$-$18_2$) respectively guiding the two bolts cooperating successively with a rib (29) borne by the inner surface of the sliding ring (6) which repels them, successively recentering first one bolt then the other bolt (25-26) to insure an unlocking in two stages.

* * * * *